Figure 1:
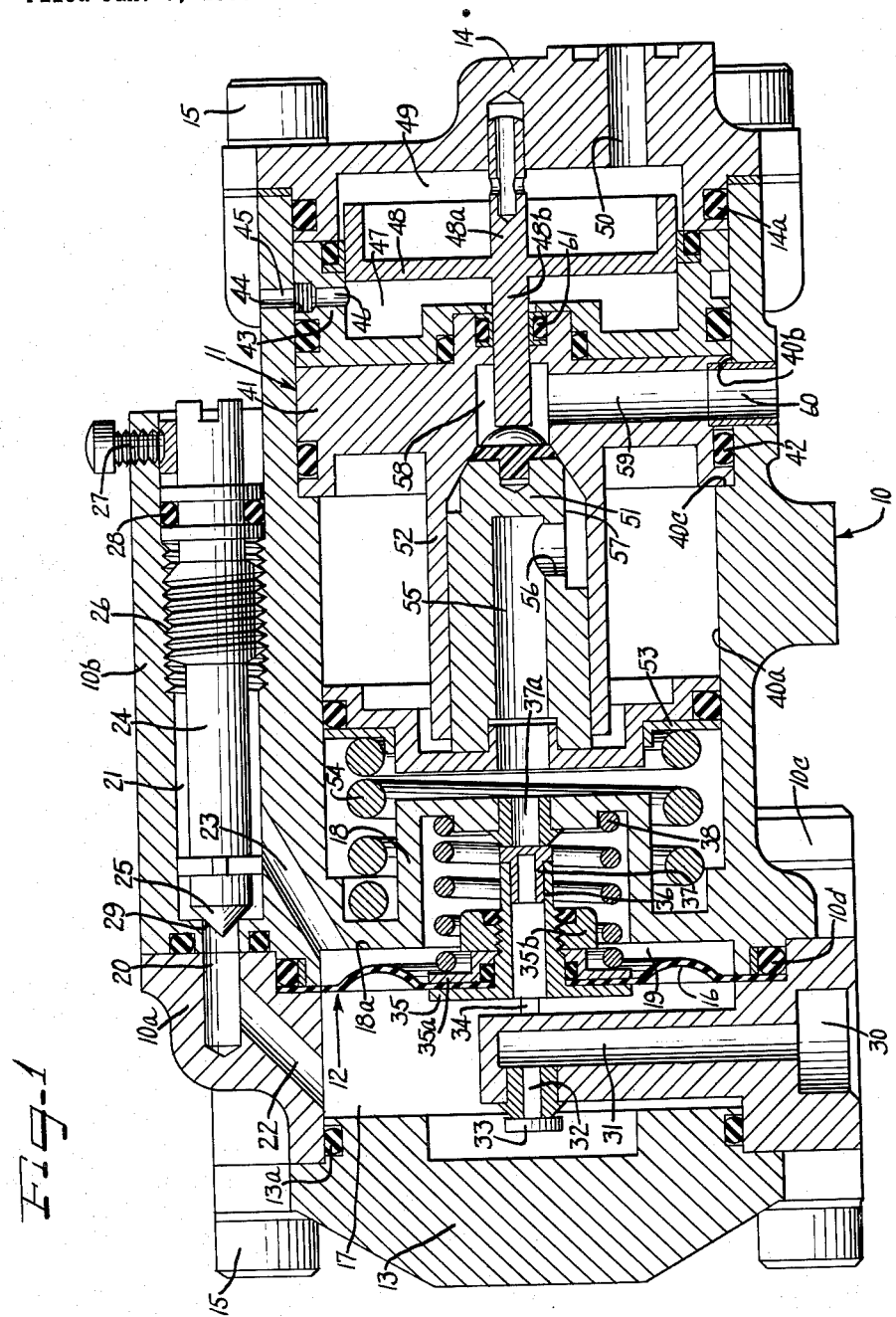

Feb. 7, 1961   D. G. BEREMAND   2,970,609
SHUT-OFF VALVE
Filed Jan. 7, 1958   2 Sheets-Sheet 1

Inventor
Donald G. Beremand

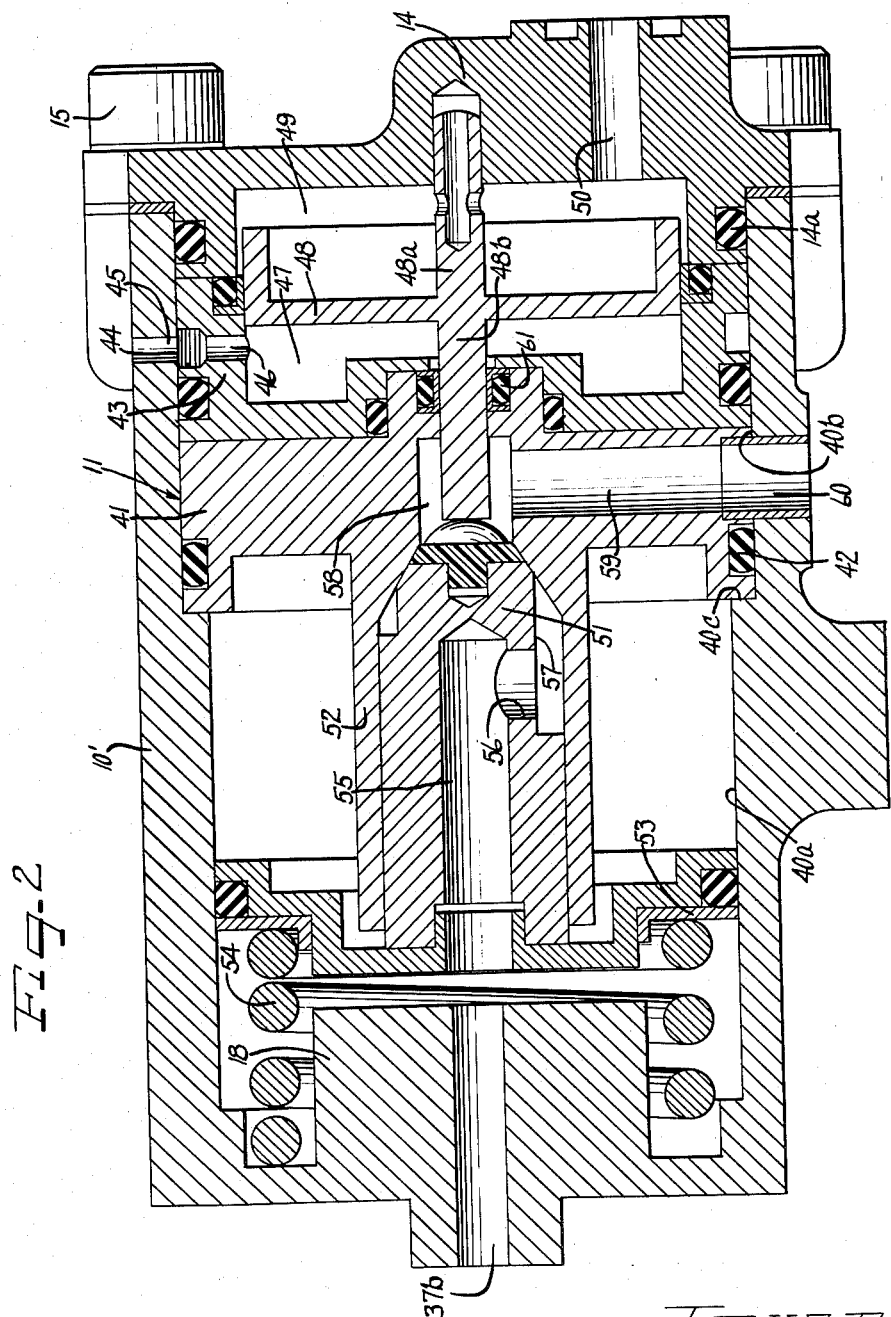

United States Patent Office 2,970,609
Patented Feb. 7, 1961

2,970,609

SHUT-OFF VALVE

Donald G. Beremand, Bay Village, Ohio, assignor to Thompson Ramo Wooldridge Inc., a corporation of Ohio Filed Jan. 7, 1958, Ser. No. 707,431

1 Claim. (Cl. 137—540)

This invention relates generally to flow control apparatus, and more particularly to shut-off valves used therein for interrupting or permitting the flow of air therethrough. This application is a continuation-in-part of my copending application for patent entitled "Regulator Valve," filed June 26, 1956, Serial No. 593,992.

The flow control is particularly useful in systems which require a carefully controlled fluid flow from a source having a widely variable pressure and which operate under high accelerations, such as a rocket fuel system wherein the fuel supply is originally under extremely high pressure and the pressure diminishes to a low value as the fuel is used, although other uses and purposes will be apparent to one skilled in the art.

In systems which require such a carefully controlled fluid flow from a source having a widely variable pressure, difficulty has been encountered in providing a flow control for such conditions in that those valves which where developed have been unduly complex and bulky, expensive to manufacture, and equipped with numerous slide fitting parts. In rocket engines, the operating components including the fuel flow control, are subjected to extreme accelerational or decelerational effects which naturally inhibit the smooth operation of the control.

In the present invention, a pressure balanced regulator valve portion is provided. The valve includes a diaphragm, wherein the pressure unbalance on opposite sides of the diaphragm is eliminated by the utilization of a plurality of pressure drop orifices and by the provision of an overhanging impingement wall on the diaphragm coacting with one of the orifices.

The control further includes a shut-off valve portion integrally contained in the same housing. The shut-off valve is so constructed that it may cooperate with the regulator portion of the flow control to provide or interrupt flow therethrough, and is also constructed to withstand the same environmental factors to which the device as a whole is exposed when utilized as a flow control for the fuel system of a rocket.

Accordingly, it is an object of this invention to provide a flow control valve which obviates the above named difficulties.

Another object of the present invention is to provide an improved fluid pressure actuated shut-off valve.

Yet another object of the present invention is to provide a shut-off valve which may be subjected to the various environmental factors encountered during the launching and operation of a rocket.

A still further object of the present invention is to provide an improved pressure actuated valve, the flow capacity of which is variable in response to a control pressure signal.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

Figure 1 is a sectional view, with a few parts in elevation, of a flow control device provided in accordance with the principles of the present invention; and Figure 2 is a more or less diagrammatic sectional view of a modified valve, showing only the shut-off section.

As shown on the drawings:

Referring particularly to Figure 1, the shut-off and regulator valve of this invention includes a casing or housing 10 which encloses on one end a shut-off valve for on-off control of the flow and generally designated by the numeral 11, and at the other end a flow regulating valve, generally designated by the numeral 12, for maintaining the flow at a constant value over a wide operating range.

The casing 10 is generally hollow and closed at opposite ends by a pair of heads 13 and 14 which are secured to the casing by suitable fasteners, such as indicated by the numerals 15. In order to prevent leakage at the heads, O-rings 13a and 14a are provided for sealingly engaging the heads to the casing. The casing 10 is sectional, and includes sections 10a and 10b suitably secured together by a plurality of fasteners 10c and in sealing relationship by an O-ring 10d.

Between the mating faces of the casing sections 10a and 10b is secured a peripheral edge of a flexible diaphragm 16, which defines with the casing section 10a and the head 13 an upper or inlet chamber 17. A cup-shaped partition 18, integrally connected to the inner walls of the casing section 10b by an annular web 18a defines with the underside of the diaphragm 16 a lower or outlet chamber 19. Outwardly from the chambers is provided a passageway 20 in the casing section 10a connecting with an enlarged passageway 21 in the casing 10b. The passageway 20 communicates with the inlet chamber 17 through a passageway 22. The enlarged passageway 21 outward of the chambers communicates with the outlet chamber 19 through a passageway 23, thereby effectively intercommunicating the chambers 17 and 19.

Carried within the passageway 21 is an adjustable shank 24 having a conical end 25 coacting with the outlet end of the passageway 20 to restrict the same. A portion of the shank 24 is externally threaded to threadedly engage the passageway 21 as at the region indicated by the numeral 26 for adjusting the pressure drop orifice defined by the conical end 25 and the outlet end of the passageway 20. A clamp and set screw arrangement 27 securely holds the shank 24 in adjusted position, and an O-ring assembly 28 prevents leakage outward of the passageway 21. Thus, a pressure drop orifice 29 is defined between the chambers 17 and 19.

The valve casing section 10a is provided with an inlet 30, which also serves as an inlet to the flow regulator 12. The inlet 30 communicates with a passageway 31 which leads to the center of the inlet chamber 17 and communicates at right angles with a pressure drop orifice or variable restriction 32. The outlet of this pressure drop orifice directs the fluid flow toward the top of the casing or the end head 13. Fluid under extremely high pressure, for example 3000 p.s.i., enters the valve inlet 30, and this extremely high pressure is lowered considerably by the pressure drop orifice 32, so that the pressure of the fluid within the inlet chamber 17 is substantially lower than the inlet pressure. As the fluid leaves the pressure drop orifice 32, it is projected against an overhanging impingement plate 33 that is substantially parallel with the diaphragm 16.

The impingement plate 33 is fastened to the diaphragm 16 by an extending leg 34 which is preferably integral with a centrally apertured annular member 35 that is secured against the one side of the diaphragm 16. Integrally extending from the plate 35 is a tubular section 36 which is closed at its outer end by a plug 37. A centrally apertured retaining plate 35a bears against the opposite side of the diaphragm 16 to coact with the plate 35 and rigidly holding the tubular section on the diaphragm. A nut 35b is threadedly received on the tubular section 36 to hold the plates together in clamping relation with the diaphragm. It will be noted that the tubular member extends within the outlet chamber 19 and the closed ends thereof coact with a pressure drop orifice 37a to define a second variable restriction. Because of the pressure drop orifice 29 between the chambers 17 and 19, fluid pressure in the chamber 19 is less than that in the chamber 17.

A spring 38 having a small spring load is interposed between the bottom of the chamber 19, which is defined by the partition 18, and the retaining plate 35a to give a desired pressure differential for valve operation. Due to the pressure drop orifice and the overhanging impingement wall 33, the spring load of the spring 38 need not be very great. Actually the use of the impingement wall 33 balances off an unbalanced pressure force thereby allowing the mass of the spring to be kept relatively small.

In operation of the flow regulator 12, an increase in fluid flow, resulting from a higher pressure differential across the valve between the inlet 30 and the outlet of the orifice 37a, results in a higher pressure drop across the metering orifice 29. This higher pressure differential acts on the diaphragm 16 which moves to the right, compressing the spring 38, and decreases the size of the two matched variable restrictions, the orifice 32 and impingement wall 33 in the chamber 17, and the orifice 37a and the plug 37 in the chamber 19. This restores the flow close to its original value, with the pressure at the inlet 30 minus the pressure in the chamber 17 plus the pressure in the chamber 19 minus the pressure at the outlet end of the orifice 37a having increased about the same as the pressure at the inlet 30 minus the pressure at the outlet 37a, the pressure in the inlet chamber 17 minus the pressure in the outlet chamber 19 having been restored close to its original value.

Preferably, the valve will be made so that the area of the orifices 32 and 37a are equal, and so that the distance between the outlet of the orifice 32 and the impingement wall 33, and between the inlet to the orifice 37a and the plug 37 are equal; then, since the same flow is passing through the restriction in the chamber 17 and the restriction in the chamber 19, neglecting fluid compressibility, the pressure drop through the restriction in the chamber 17 must equal the pressure drop through the restriction in the chamber 19. In addition, these pressure drops act on equal areas and in opposite direction. Thus, these pressure forces are balanced so that they have no net effect on the diaphragm. The load of the spring 38 can now be made relatively small since there is no need to minimize the effects of an unbalanced pressure force. Thus, the valve of this design is capable of operation over a large pressure drop range and under high acceleration conditions with good accuracy.

Referring now to the shut-off valve 11, shown in combination with the regulator valve in Figure 1, and shown individually with a slightly modified housing 10' in Figure 2, it will be understood that this part of the valve provides for on-off control of the flow. The shut-off valve must seal in the shut-off position against an extremely high pressure differential, e.g. as high as 3000 p.s.i. with no leakage for long periods of time. The casings 10b and 10' are each provided with a pair of communicating counterbores 40a and 40b which define a shoulder 40c therebetween. Bearing directly against the shoulder 40c is a body member 41 received within the bore 40b and in sealing relationship therewith by virtue of an O-ring 42. Also received within the bore 40b and intimately engaging one side of the body member 41 is a cup-shaped retainer 43 having a circumferential annular groove 44. The groove 44 communicates with an aperture 45 extending through the casings 10' and 10b respectively and to the atmosphere on one side, and with an aperture 46 extending radially through the upstanding portion of the member 43 to communicate with a chamber 47. Thus the chamber 47 is at all times communicable with the atmosphere.

Slidably received within the open end of the cup-shaped member 43 is an actuating piston 48 which coacts with the cup-shaped member 43 to define the chamber 47 and defines on the opposite side a pressure chamber 49. The pressure chamber 49 is provided with an inlet 50 extending through the end head 14 and which is suitably connected to a pneumatic pressure source, such as the combustion chamber of a gas expanding engine.

One end of the piston 48 is provided with a guide stem 48a which is slidably received in a bore in the end head 14, and the other end of the piston 48 is provided with an actuating stem 48b which is slidably received within aligned apertures formed in the cup-shaped plate 43 and the body member 41. A distal end of the actuating stem 48b is adapted to bear against one end of a tapered poppet valve member 51 having a conical valve face coacting with a conical valve seat formed in a tubular extension and extending from one side of the body member 41 into an enlarged cylindrical chamber defined by the housing wall having the counterbore 40a. The valve member 51 is slidably received within the tubular extension 52 and bears against a spring retaining plate arrangement 53 which engages a spring 54 that constantly urges the valve member 51 into seating relationship with the valve seat formed on the tubular extension 52.

Flow of fluid leaving the orifice 37a in Figure 1 or entering the inlet 37b in Figure 2 passes through the plate arrangement 53 which is centrally apertured and into a longitudinal bore 55 formed in the valve member 51. A radially extending passageway 56 connects the bore 55 with a cutaway portion 57 of the valve member 51 that permits flow of fluid into a chamber 58 formed in the valve body 41 when the valve member 51 is unseated. As seen most clearly in Figure 2, a radially extending passageway 59 leads from the chamber 58 to an outlet 60 in the casing section 10b or housing 10'. Additionally, the tapered poppet valve member 51 is held against its seat by the pressure differential between the pressure at the head of the sliding valve member 51 and the pressure at the outlet passageway 59, this differential acting on the valve member 51.

In operation, when signal pressure is referenced to the one side of the actuating piston 48 in communication with the chamber 49 via the inlet 50, the actuating piston will open the poppet valve and unseat the valve member 51 when the pressure differential between the signal pressure and the atmosphere times the area of the actuating piston 48 exceeds the spring force plus the differential pressure between the head of the valve member 51 and the outlet chamber 58 times the area of the poppet.

In closing, the poppet valve 51 will not close until the signal pressure minus the atmospheric pressure times the actuating piston area becomes less than the spring force alone, since in the open position the poppet valve presents no significant restriction to flow and the pressure at the head of the poppet valve 51 equals the pressure at the outlet chamber 58. During flow, an O-ring backed Teflon seal 61 prevents leakage across the actuating piston rod 48b to the back of the actuating piston.

It will be understood that this shut-off valve is capable of obtaining a positive seal during the shut-off period, since the only sliding seal which might be subjected to a slight seepage is located downstream of the poppet type shut-off. In the application of the present invention, the period of flow will in most cases be short and a slight seepage through the Teflon seal 61 during flow is not objectionable. Since the poppet valve member 51 is not firmly attached to the actuating piston 48, accurate concentricity of the valve seat with the actuating piston is not required.

Although various minor modifications might be suggested by those versed in the art, it should be understood that I wish to embody within the scope of the patent warranted hereon all such embodiments as reasonably and properly come within the scope of my contribution to the art.

I claim as my invention:

In a valve for controlling fluid flow, the improvement of: a housing having a main flow passage, the ends of which define inlet and outlet ports, said passage including a generally cylindrical valve-receiving recess, and a generally cylindrical spring-receiving recess of a larger diameter communicating directly therewith, said housing having a valve seat at one end of said valve-receiving recess directed toward the other end thereof and toward said spring-receiving recess; a poppet valve slidably received and guided directly by said housing in said valve-receiving recess for sealing engagement with said seat; circular spring-retaining means having an axial extent less than its diameter, and disposed in said spring-receiving recess, said retaining means continually directly engaging the other end of said poppet valve and having an axial projection telescopically received within said other end of said valve for effecting cocking-preventing guidance of said spring-retaining means by said valve; a helical spring of a diameter intermediate that of said recesses and received in said spring-receiving recess, and operative between said housing and said spring-retaining means to continually urge said retaining means against said other end of said valve and to bias said poppet valve toward said seat; and said spring-retaining means having a portion directed axially away from said valve for engaging an axially spaced wall of the housing at a point radially within said spring to limit therewith the movement of said poppet valve in an opening direction.

References Cited in the file of this patent

UNITED STATES PATENTS

| | | |
|---|---|---|
| 2,043,632 | Stover | June 9, 1936 |
| 2,476,378 | Majneri | July 19, 1949 |
| 2,673,062 | Cornelius | Mar. 23, 1954 |
| 2,873,084 | Timmerman | Feb. 10, 1959 |

FOREIGN PATENTS

| | | |
|---|---|---|
| 320,356 | Italy | Aug. 16, 1934 |
| 685,200 | Great Britain | of 1952 |